(12) United States Patent
Ohkoshi et al.

(10) Patent No.: US 11,087,792 B2
(45) Date of Patent: Aug. 10, 2021

(54) ORIENTED BODY, METHOD FOR PRODUCING THE SAME, DEVICE FOR PRODUCING THE SAME, AND MAGNETIC RECORDING MEDIUM

(71) Applicants: THE UNIVERSITY OF TOKYO, Tokyo (JP); DOWA ELECTRONICS MATERIALS CO., LTD., Tokyo (JP)

(72) Inventors: Shin-ichi Ohkoshi, Tokyo (JP); Kenta Imoto, Tokyo (JP); Shizuka Anan, Tokyo (JP); Asuka Namai, Tokyo (JP); Kenji Masada, Tokyo (JP)

(73) Assignees: THE UNIVERSITY OF TOKYO, Tokyo (JP); DOWA ELECTRONICS MATERIALS CO., LTD., Tokyo (JP)

( * ) Notice: Subject to any disclaimer, the term of this patent is extended or adjusted under 35 U.S.C. 154(b) by 458 days.

(21) Appl. No.: 15/780,057

(22) PCT Filed: Nov. 30, 2016

(86) PCT No.: PCT/JP2016/085493
§ 371 (c)(1),
(2) Date: May 30, 2018

(87) PCT Pub. No.: WO2017/094752
PCT Pub. Date: Jun. 8, 2017

(65) Prior Publication Data
US 2018/0366151 A1 Dec. 20, 2018

(30) Foreign Application Priority Data
Nov. 30, 2015 (JP) ............................. JP2015-233774

(51) Int. Cl.
*G11B 5/706* (2006.01)
*C01G 55/00* (2006.01)
*C01G 49/06* (2006.01)
*G11B 5/00* (2006.01)
*H01F 1/11* (2006.01)

(52) U.S. Cl.
CPC .......... *G11B 5/70605* (2013.01); *C01G 49/06* (2013.01); *C01G 55/00* (2013.01);
(Continued)

(58) Field of Classification Search
CPC ...... C01G 49/00; C01G 55/00; C01G 55/002; C01G 49/06; H01F 1/11; C01P 2002/42;
(Continued)

(56) References Cited

U.S. PATENT DOCUMENTS 9,458,026 B2 * 10/2016 Ohkoshi ................. H01F 1/047
10,669,161 B2 * 6/2020 Ohkoshi ................ G11B 5/845
(Continued)

FOREIGN PATENT DOCUMENTS

EP 2447965 A1 5/2012
JP 2008-063201 A 3/2008
(Continued)

OTHER PUBLICATIONS

Sakurai et al., "Large coercive field in magnetic-field oriented ε-Fe2O3 nanorods", Chem Phys Lett, vol. 458, May 6, 2008, pp. 333-333 (Year: 2008).*
(Continued)

*Primary Examiner* — Holly Rickman
(74) *Attorney, Agent, or Firm* — Greenblum & Bernstein, P.L.C.

(57) ABSTRACT

There is provided an oriented body containing platinum group-substituted-ε iron oxide particles typified by Rh-substituted ε-iron oxide or Ru-substituted ε-iron oxide applicable to MAMR, MIMR, or F-MIMR system, and a technique related thereto, containing platinum group element-substituted ε-iron oxide particles in which a part of ε-iron oxide is substituted with at least one element of platinum group elements, as magnetic particles wherein the degree of orientation of the magnetic particles defined by the degree of
(Continued)

orientation=SQ (direction of magnetization easy-axes)/SQ (direction of magnetization hard-axes) exceeds 5.0, and a coercive force exceeds 31 kOe.

6 Claims, 12 Drawing Sheets

(52) U.S. Cl.
CPC ............ *G11B 5/70642* (2013.01); *H01F 1/11* (2013.01); *C01P 2002/54* (2013.01); *C01P 2006/42* (2013.01); *G11B 2005/0024* (2013.01)

(58) Field of Classification Search
CPC .............. C01P 2002/54; C01P 2006/42; G11B 2005/0024; G11B 5/70605; G11B 5/70642; G11B 5/852
See application file for complete search history.

(56) References Cited

U.S. PATENT DOCUMENTS

| | | |
|---|---|---|
| 2012/0263642 A1 | 10/2012 | Ohkoshi et al. |
| 2015/0111066 A1 | 4/2015 | Terakawa et al. |
| 2016/0343484 A1 | 11/2016 | Ohkoshi et al. |
| 2017/0349448 A1 | 12/2017 | Ohkoshi et al. |

FOREIGN PATENT DOCUMENTS

| | | |
|---|---|---|
| JP | 2009-206376 A | 9/2009 |
| JP | 2015-82329 A | 4/2015 |
| JP | 2016-135737 A | 7/2016 |
| WO | 2011/040534 A1 | 4/2011 |

OTHER PUBLICATIONS

European Search Report, European Patent Office, Patent Application No. 16870689.3, dated Jun. 28, 2019.

"Hard magnetic ferrite with a gigantic coercivity and high frequency millimeter wave rotation," Asuka Namai et al, Sep. 4, 2012, p. 1-6.

International Search Report from Patent Application No. PCT/JP2016/085493, dated Feb. 28, 2017.

International Preliminary Report on Patentability from Patent Application No. PCT/JP2016/085493, dated Jun. 5, 2018.

* cited by examiner

1*... Application of magnetic field
2*... Irradiation of millimeter wave
3*... Resonance frequency

ORIENTED BODY, METHOD FOR PRODUCING THE SAME, DEVICE FOR PRODUCING THE SAME, AND MAGNETIC RECORDING MEDIUM

TECHNICAL FIELD

The present invention relates to an oriented body, a method for producing the same, a device for producing the same, and a magnetic recording medium.

DESCRIPTION OF RELATED ART

ε-iron oxide is an extremely rare phase among iron oxides. Existence of ε-iron oxide showing a huge coercive force (Hc) of 20 kOe ($1.59 \times 10^6$ A/m) at room temperature with a particle size of nano order has been confirmed. α-iron oxide and γ-iron oxide are most common among polymorphs which have a composition of iron oxide but differ in crystal structure. However, ε-iron oxide is one of them.

Since this ε-iron oxide shows huge Hc, it is expected to be applied to a magnetic recording medium of high recording density and other magnetic applications, or to electric wave absorption applications.

Under such a circumstance, the present inventors succeeded in a development of Rh-substituted ε-iron oxide ($\varepsilon\text{-Rh}_x\text{Fe}_{2-x}\text{O}_3$) in which a part of ε-iron oxide is substituted with rhodium ion ($Rh^{3+}$) as shown in Non-Patent Document 1. This Rh-substituted ε-iron oxide has a high coercive force of 31 kOe at room temperature, and such a coercive force is comparable to the coercive force of rare earth magnets.

Further, Rh-substituted ε-iron oxide has the following major features that are noteworthy.

When the Rh-substituted ε-iron oxide is irradiated with a millimeter wave (a radio wave having a wavelength of 1 to 10 mm and a frequency of 30 to 300 GHz) which is one type of electromagnetic waves, it shows the rotation of millimeter wave polarization plane at a high frequency of 220 gigahertz (1 gigahertz=$10^9$ hertz). This means that the Rh-substituted ε-iron oxide has a performance as a high-frequency millimeter wave magnetic rotating element.

Conventionally, the above frequency band is known as a frequency band suitable for wireless communication because absorption by the atmosphere is small. A magnetic material that absorbs electromagnetic waves having a high frequency as described above is not known until the Rh-substituted ε-iron oxide disclosed in Non-Patent Document 1 has been developed. In this sense, the technique described in Non-Patent Document 1 is very promising. Further, the present inventors disclose in Patent Document 1, an example in a case of using Ga-substituted ε-iron oxide as an oriented body, and the degree of orientation in this case is 4.6.

Note that priority is claimed based on the basic application (Japanese Patent Application No. 2015-233774) of the present application. Priority is applied to the contents described in the basic application specification etc., ie, the invention reflecting the technical idea, and therefore Patent Document 1 published after the filing date of the basic application is not strictly a prior art document. Here, in order to show that the invention described in this specification etc. is excellent, Patent Document 1 is merely listed as a document before the filing date of the present application.

PRIOR ART DOCUMENT

Patent Document

[Patent Document 1] Japanese Unexamined Patent Publication No. 2016-135737

Non-Patent Document

[Non-Patent Document 1] A. Namai, M. Yoshikiyo, K. Yamada, S. Sakurai, T. Goto, T. Yoshida, T. Miyazaki, M. Nakajima, T. Suemoto, H. Tokoro, S. Ohkoshi, Nature Communications 3, 1035 (2012).

SUMMARY OF THE INVENTION

Problem to be Solved by the Invention

The present inventors study whether Rh-substituted ε-iron oxide, which is promising for applications such as wireless communication, can be utilized in still another field. At that time, attention was paid to the fact that the Rh-substituted ε-iron oxide causes rotation of a polarization plane by irradiation with millimeter waves. Further, according to the knowledge of the inventors, the ε-iron oxide substituted with an element of a platinum group has a high coercive force as a whole compared with a pure (unsubstituted) iron oxide. Based on such a knowledge, when the inventors study on ruthenium (Ru), it is also found that Ru-substituted epsilon iron oxide also has a performance as a similar high-frequency millimeter wave magnetic rotating element. Then, it is also found that these unique properties can be used for a magnetic recording medium of a specific type.

The specific method referred to here may be a method called MAMR or a method called MIMR. MAMR is an abbreviation for Microwave Assisted Magnetic Recording, and is a technique to reduce a recording magnetic field by resonating high frequency magnetic field and magnetic moment by being irradiated with microwave energy (high frequency magnetic field), while using a magnetic material having a high magnetic anisotropic energy (it is relatively high in heat stability but relatively difficult to reverse magnetization). Further, MIMR is an abbreviation for millimeter-wave assisted magnetic recording (Millimeter-wave Assisted Magnetic Recording), in which the abovementioned microwave is replaced with a millimeter wave, and there are no examples of MIMR reported at present.

In presently known MAMR, there are many cases using regular alloys such as iron platinum, and in the case of constituting a magnetic recording medium, a vapor deposition method is used in many cases. Accordingly, in MAMR which has being originally studied, it is difficult to divert a device which has been used conventionally, thus involving a problem that initial investment is increased. If a coating method is used in MAMR, it becomes possible to divert the device which has been used conventionally, which is desirable because the initial investment is reduced. Accordingly, magnetic powder of a possible powder form applicable to MAMR is strongly desired.

In a platinum group-substituted ε-iron oxide typified by the abovementioned Rh-substituted ε-iron oxide or the Ru-substituted ε-iron oxide, when adopted for MAMR and MIMR, resonance between high frequency magnetic field and magnetic moment occurs, so it is strongly expected that so-called ferromagnetic resonance easily occurs. The fact that the ferromagnetic resonance easily occurs is likely to be affected by an external magnetic field, and therefore it is expected that magnetization reversal will occur with a weak direct current magnetic field. Namely, it is expected that magnetic recording can be performed with low electric power, and a magnetic recording method with low load on the environment can be performed. Since such an effect is expected, it is necessary to use a material capable of absorbing millimeter waves as a magnetic material for a magnetic recording medium for MAMR or MIMR, and particularly epsilon type iron oxide and metal substitution products thereof are candidates for the above magnetic material. The epsilon type iron oxide and metal substitution products thereof have a remarkable absorption of millimeter waves and can probably be applied to a new magnetic recording mechanism described later, and clarification of its mechanism and application to magnetic recording are strongly expected.

Here, as one of millimeter wave assisted magnetic recording mechanism, FIG. 1 shows an example thereof. The recording mechanism will be specifically described with reference to FIG. 1. Namely, the millimeter wave assisted magnetic recording mechanism is a mechanism as follows: by applying an external magnetic field to an object, magnetization in a magnetic material is destabilized energetically ((1)→(2)). Then, the object is irradiated with a millimeter wave which is a resonance frequency, precession of magnetization (a phenomenon of swaying a circle by a rotation axis of an object rotating on its axis) is induced, namely, the rotation axis of magnetization is tilted by irradiation of millimeter waves, to thereby reduce a write magnetic field only when the object is irradiated with millimeter waves so that the magnetization can be reversed (FIG. 1 (3)).

FIG. 2 shows and specifically describe a process of writing to a magnetic medium in which application of an external magnetic field and irradiation of millimeter waves are combined. First, as shown in FIG. 2 (1), a magnetic field is applied in an initial state. Next, as shown in FIG. 2 (2), magnetization is passed through a state in which the magnetization is tilted but not reversed as shown in FIG. 2 (2), and further the magnetization starts a precession movement by irradiation of millimeter waves of resonance frequency as shown in FIG. 2 (3), and the magnetization is greatly tilted as shown in FIG. 2 (4), and the magnetization is reversed as shown in FIG. 2 (5). Here, even if the application of the magnetic field and irradiation of millimeter waves are stopped, a magnetization reversed state is maintained as shown in FIG. 2 (6), and the magnetic recording is completed.

As a magnetization reversal mechanism, by using a millimeter wave focusing system capable of focusing millimeter waves, it is considered that a range of magnetization reversal can be reduced, and a writing area can be small, and as a result, a higher density magnetic recording medium can be obtained. This is called a focusing type millimeter wave resonance magnetic recording system (F-MIMR, Focused Millimeter wave resonance magnetic recording).

As a millimeter wave focusing system in F-MIMR, a ring resonator etc. can be considered. FIG. 3 shows a head for F-MIMR equipped with a millimeter wave focusing system using a millimeter wave generating ring resonator. When the millimeter wave generating ring resonator made of a conductor is irradiated with pulsed electromagnetic waves, an electromagnetic wave having a wavelength corresponding to a ring length is irradiated. When simulation is performed by electromagnetic field analysis, to a light focusing state assumed in a case of operating the F-MIMR head shown in FIG. 3, an analysis result as shown in FIG. 4 is obtained. As a result, it can be estimated that the light can be focused inside of a portion enclosed by a thick line in the figure, and a size can be estimated as 100 nm or less in diameter.

However, after intensive studies by inventors of the present invention, it is found that there are further points to be improved in an oriented body containing Rh-substituted ε-iron oxide particles described in Non-Patent Document 1, when MAMR, MIMR, or F-MIMR system is taken into consideration.

Under the abovementioned circumstance, the present invention is provided, and an object of the present invention is to provide an oriented body containing platinum group-substituted ε-iron oxide particles typified by Rh-substituted ε-iron oxide or Ru-substituted ε-iron oxide applicable to MAMR, MIMR, or F-MIMR system, and a technique related thereto.

Means for Solving the Problem

After intensive studies by the inventors of the present invention, it is found that in the abovementioned oriented body containing the Rh-substituted ε-iron oxide particles, the effect of magnetization reversal by MAMR, MIMR, or F-MIMR system is obtained, but there is a point to be improved in terms of the degree to which the magnetic particles are oriented along one direction (namely, the degree of orientation).

For example, when applied to MAMR, MIMR, or F-MIMR system, the degree of orientation is 4.6 in the Ga-substituted ε-iron oxide described in Patent Document 1, and when used in magnetic recording applications, it is desirable to further improve the degree of orientation.

In this specification, the degree of orientation of the magnetic particles is defined as a value of the squareness ratio (SQ) as shown in the formula (1).

(Degree of orientation)=$SQ$ (direction of magnetization easy-axes)/$SQ$ (direction of magnetization hard-axes, namely, in-plane direction)   Formula (1)

Particularly in the case of the Rh-substituted ε-iron oxide, according to the present investigation by the present inventors, it is found that a plot of ○, namely, upper and lower sides of the loop at 90° (in-plane direction) in FIG. 8 of example 1 described later, are extremely adjacent to each other. It is also found that the platinum group-substituted ε-iron oxide typified by Rh-substituted ε-iron oxide or Ru-substituted ε-iron oxide is a substance having a relatively high uniaxial crystal magnetic anisotropy. Namely, it is also found that by improving the method for producing the oriented body in some form, the degree of orientation of the platinum group-substituted ε-iron oxide typified by Rh-substituted ε-iron oxide or Ru-substituted ε-iron oxide can be remarkably improved.

In view of the abovementioned point, as a result of trial and error by the inventors of the present invention, it is found that the degree of orientation can be increased compared with that described in Non-Patent Document 1, by adopting a specific method (installation of a partition frame at the time of preparing the oriented body) when preparing the oriented body containing platinum group-substituted ε-iron oxide typified by Rh-substituted ε-iron oxide or Ru-substituted ε-iron oxide as magnetic particles.

Namely, in order to solve the abovementioned problem, a first invention is an oriented body containing platinum group element-substituted ε-iron oxide particles in which a part of ε-iron oxide is substituted with at least one element of platinum group elements, as magnetic particles wherein the degree of orientation of the magnetic particles defined by the degree of orientation=SQ (direction of magnetization easy-axes)/SQ (direction of magnetization hard-axes) exceeds 5.0, and a coercive force exceeds 31 kOe.

A second invention is the oriented body of the first invention, wherein the platinum group element is rhodium (Rh) or ruthenium (Ru).

A third invention is a method for producing an oriented body, including:

injecting a mixed solution in which platinum group element-substituted ε-iron oxide particles are dispersed, into a region partitioned by a partition frame on a predetermined base, wherein the platinum group element-substituted ε-iron oxide particles are obtained by substituting a part of ε-iron oxide with at least one element of platinum group elements; and removing a solvent of the mixed solution while applying a magnetic field to the region to obtain an oriented body.

A fourth invention is a device for producing an oriented body having a function of:

injecting a mixed solution in which platinum group element-substituted ε-iron oxide particles are dispersed, into a region partitioned by a partition frame on a predetermined base, wherein the platinum group element-substituted ε-iron oxide particles are obtained by substituting a part of ε-iron oxide with at least one element of platinum group elements; and removing a solvent of the mixed solution while applying a magnetic field to the region to obtain an oriented body.

A fifth invention is a magnetic recording medium, for microwave assisted magnetic recording (MAMR), millimeter wave assisted magnetic recording (MIMR) or focused millimeter wave resonance magnetic recording (F-MIMR) in which the oriented body of the first or second invention is used.

A sixth invention is a magnetic recording medium using an oriented body containing epsilon type iron oxide substituted with a metal element, in which a millimeter wave absorption performance is utilized, which is generated due to a natural resonance of the epsilon type iron oxide which is a magnetic material to be used, and a magnetic recording mode is millimeter wave assisted magnetic recording (MIMR) or focused millimeter wave resonance magnetic recording (F-MIMR).

A seventh invention is an oriented body containing Rh-substituted ε-iron oxide particles in which a part of ε-iron oxide is substituted with rhodium (Rh) as magnetic particles, wherein the degree of orientation of the magnetic particles defined by the degree of orientation=SQ (direction of magnetization easy-axes)/SQ (direction of magnetization hard-axes) exceeds 3.5, and a coercive force exceeds 31 kOe.

Advantage of the Invention

According to the present invention, it is possible to provide an oriented body containing Rh-substituted ε-iron oxide particles applicable to MAMR, MIMR, or F-MIMR system, and a technique related thereto.

DETAILED DESCRIPTION OF THE INVENTION

Figure 1:
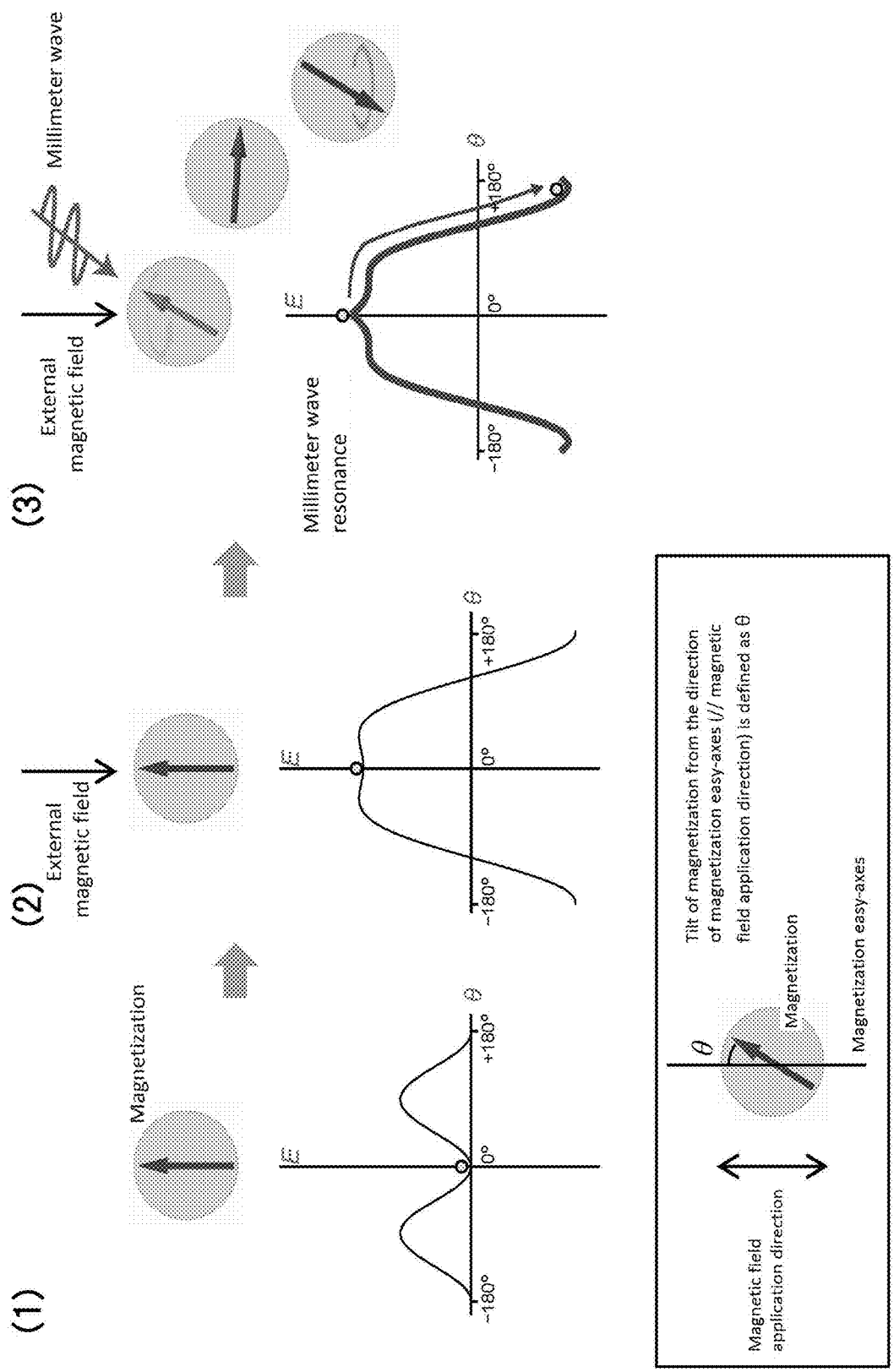
FIG. 1 is a conceptual diagram of magnetic recording in millimeter wave assisted magnetic recording, wherein in the graph in the figure, the vertical axis indicates energy of magnetization, and the horizontal axis indicates tilt (θ) of magnetization.
Figure 2:
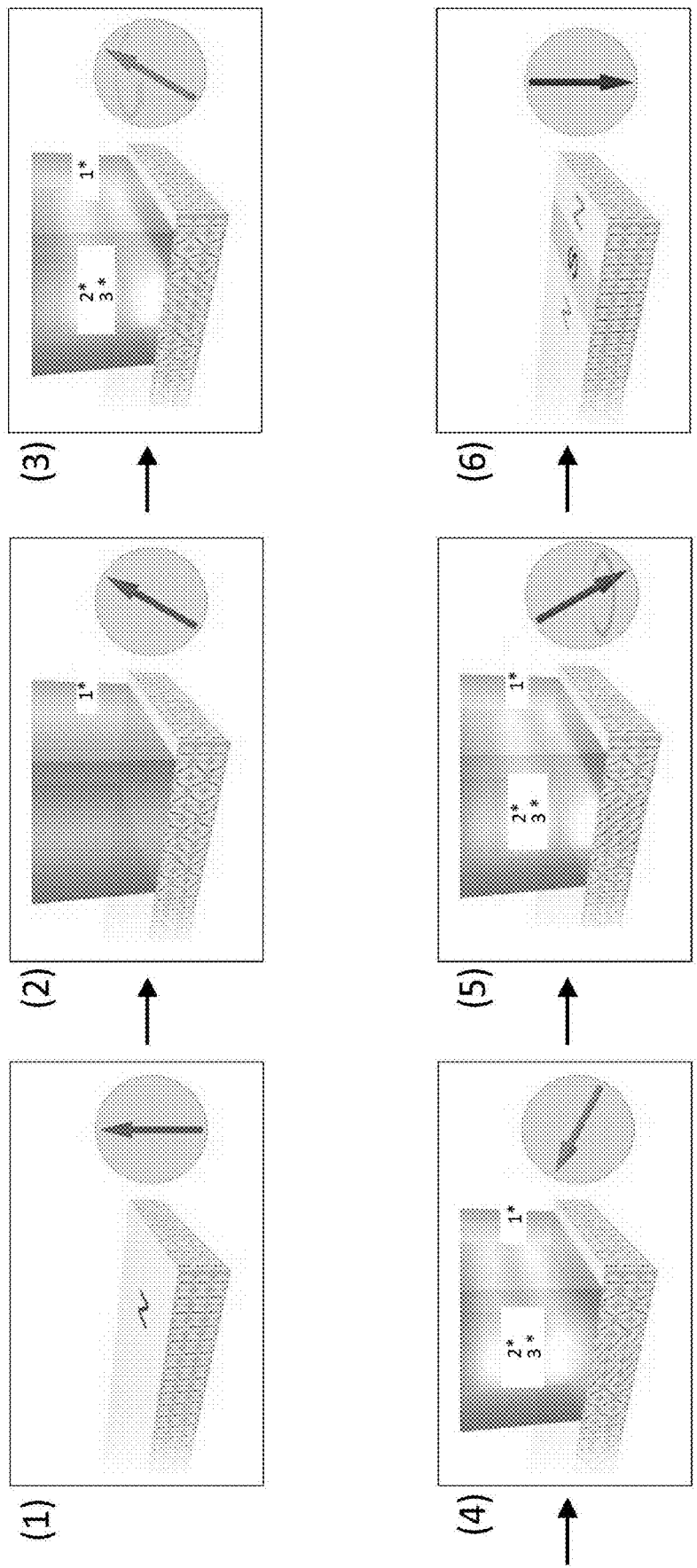
FIG. 2 is a conceptual diagram showing a write state of magnetic recording combining an external magnetic field application and millimeter wave irradiation in millimeter wave assisted magnetic recording.
Figure 3:
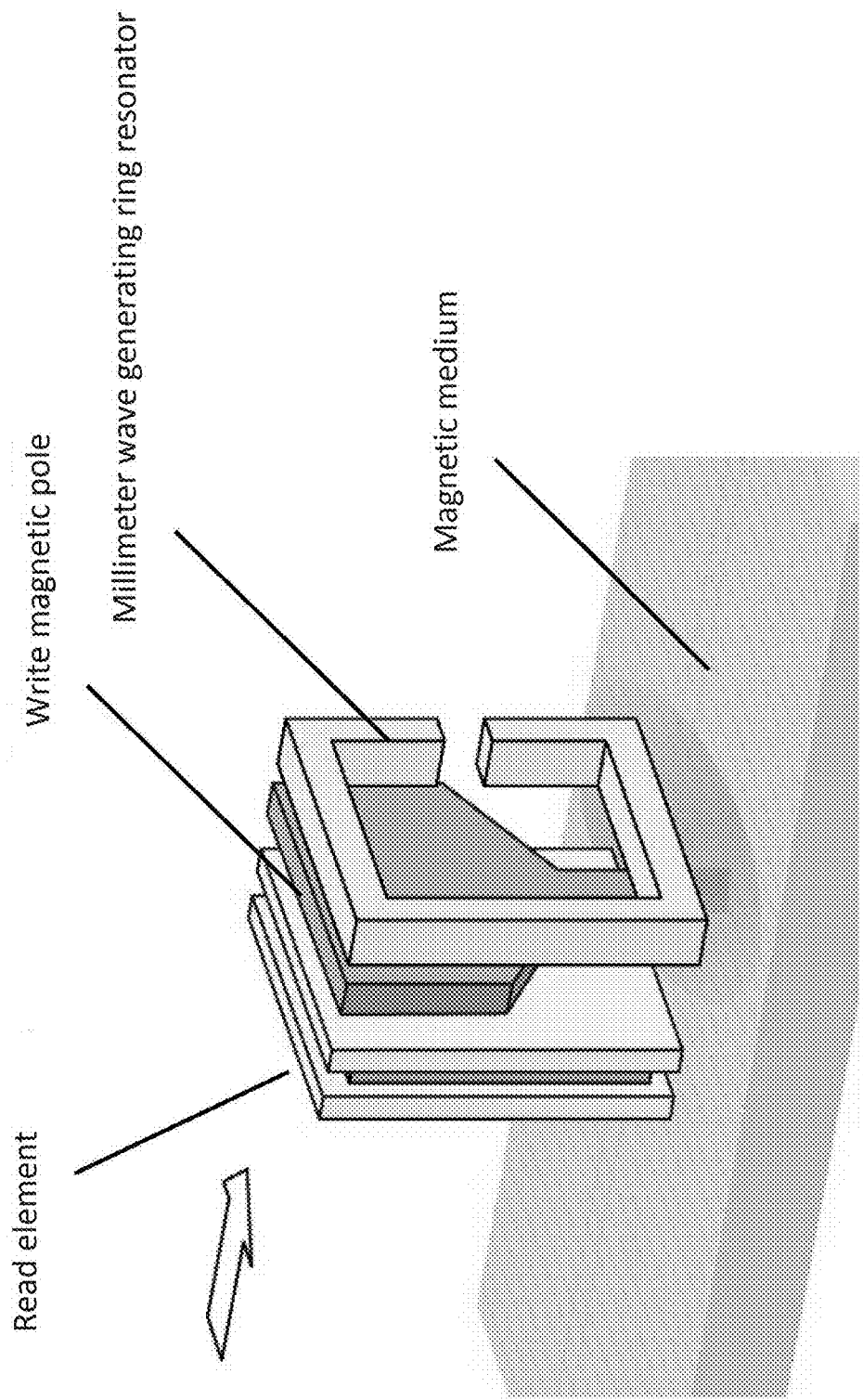
FIG. 3 is a schematic diagram of a head for F-MIMR equipped with a millimeter wave focusing system in which a millimeter wave generating ring resonator is used.
Figure 4:
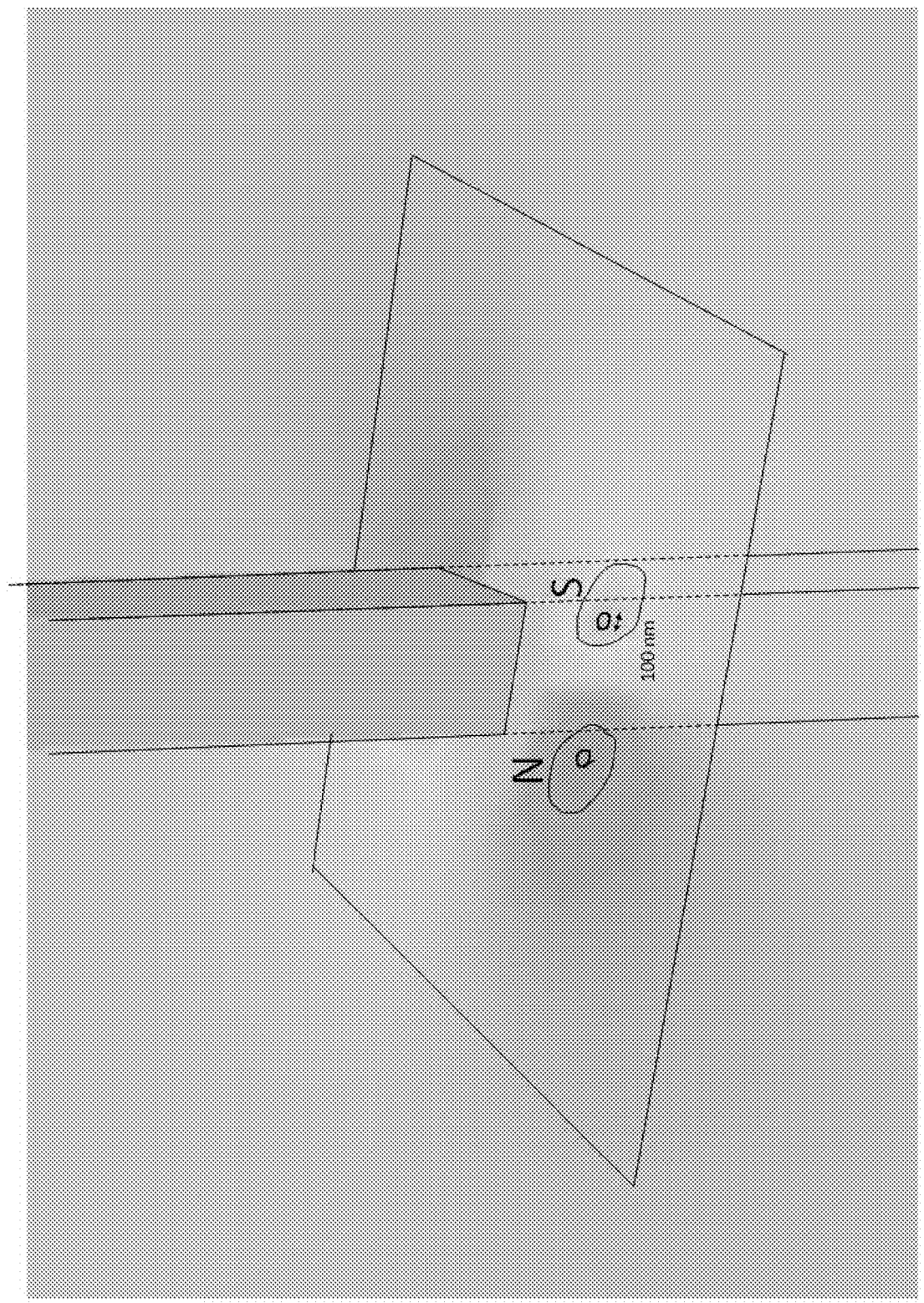
FIG. 4 is a simulation of a distribution of magnetic field components of millimeter waves generated from a millimeter wave generating ring resonator.

Embodiments of the present invention will be described in an order of (1) magnetic particles, (2) method for dispersing magnetic particles, (3) method for orienting magnetic particles, (4) vehicle, (5) magnetic properties of an oriented body containing platinum group-substituted ε-iron oxide typified by Rh-substituted or Ru-substituted ε-iron oxide according to the present invention, and (6) device for producing an oriented body containing platinum group-substituted ε-iron oxide typified by Rh-substituted ε-iron oxide or Ru-substituted ε-iron oxide according to the present invention.

(1) Magnetic Particles

The magnetic particles used in the present invention are preferably platinum group-substituted ε-iron oxide particles typified by Rh-substituted ε-iron oxide or Ru-substituted ε-iron oxide having a high coercive force (Hc).

The method described in Non-Patent Document 1 may be adopted for a method for producing platinum group-substituted ε-iron oxide particles typified by the Rh-substituted ε-iron oxide or Ru-substituted ε-iron oxide. Details will be described in the following examples.

As described above, the reason why ipsilon type iron oxide magnetic particles in which a part of the iron element is substituted with a platinum group element such as rhodium (Rh) or ruthenium (Ru) exhibits higher coercive force than unsubstituted ε-iron oxide particles, is not clear in many cases. However, it is confirmed that rhodium (Rh) or ruthenium (Ru) out of the four non-equivalent iron sites ($Fe_A$-$Fe_D$ sites) in a crystal structure of ε-$Fe_2O_3$ (orthorhombic: space group $Pna2_1$), selectively substitutes $Fe_C$ site, and owing to such a unique property, it is considered that a magnetic material with an extremely high coercive force is obtained.

(2) Method for Dispersing Magnetic Particles

Explanation will be given for an operation for obtaining a dispersion liquid by dispersing platinum group-substituted ε-iron oxide particles typified by Rh-substituted ε-iron oxide or Ru-substituted ε-iron oxide in a predetermined solvent, using a shaking type stirring device.

Platinum group-substituted ε-iron oxide particles typified by Rh-substituted ε-iron oxide or Ru-substituted ε-iron oxide, a predetermined solvent, a vehicle, a mixing ball (for example, zirconia ball of 0.3 mmϕ) are charged into a container such as a centrifuge tube. Then, by shaking the container at a shaking number of 100 to 3000 times/min, amplitude of 1 to 10 mm, and 0.5 to 10 hours, a dispersion liquid is obtained.

According to a conventional art, for example, as disclosed in Japanese Patent No. 5124825, the magnetic particles are dispersed in a predetermined medium by using an ultrasonic type stirring and dispersing device or a large-scale rotary type stirring and dispersing device such as a planetary ball mill.

In contrast, according to the present invention, it is found that when platinum group-substituted ε-iron oxide particles typified by Rh-substituted ε-iron oxide or Ru-substituted ε-iron oxide are dispersed as magnetic particles in a predetermined solvent of the present invention, an oriented body with high degree of orientation can be obtained even in the case of a dispersion using a simple method and device such as a shaking type stirring device.

(3) Method for Orienting Magnetic Particles

The dispersion liquid of the present invention obtained by dispersing the abovementioned platinum group-substituted ε iron oxide particles typified by Rh-substituted ε-iron oxide or Ru-substituted ε-iron oxide in a predetermined solvent, is provided on a base. For example, a polyester film may be adhered onto a glass base and the dispersion liquid may be dropped onto the film.

Figure 7:
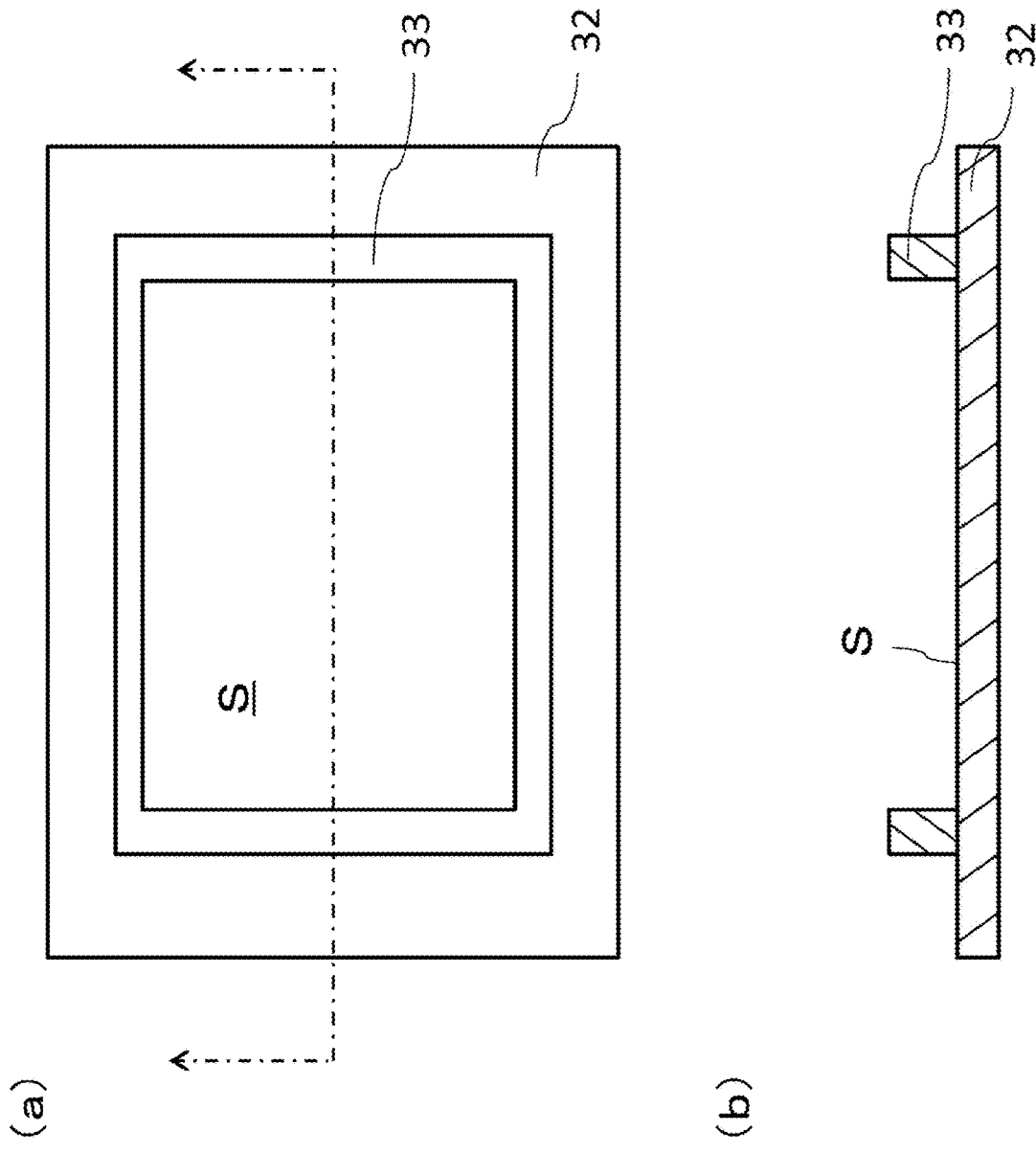
FIG. 7 is a schematic diagram showing a base used for forming an oriented body (film-like magnetic sheet) and a partition frame provided thereon, in a device for producing an oriented body containing Rh-substituted ε-iron oxide of the present invention, wherein (a) is a plan view and (b) is a cross-sectional view.

This embodiment is greatly characterized in this dripping. Explanation will be given hereafter using FIG. 7. FIG. 7 is a schematic diagram showing a base used for forming an oriented body (film-like magnetic sheet) and a partition frame provided thereon, in a device for producing an oriented body containing a platinum group-substituted ε-iron oxide typified by Rh-substituted ε-iron oxide or Ru-substituted ε-iron oxide according to the present invention, wherein (a) is a plan view and (b) is a cross-sectional view.

First, a predetermined region S is previously isolated from the other region by the partition frame 33 on the base 32. Then, the abovementioned dispersion liquid is injected (dropped) into the closed region S. Thereafter, the dispersion liquid of the present invention provided on the obtained base is placed under a magnetic flux density of 2 Tesla or more, preferably 3 Tesla or more, more preferably 6 Tesla or more, most preferably 8 Tesla or more, from a viewpoint of increasing the certainty of orientation, and the mixed solvent is volatilized to cure the vehicle to obtain a magnetic sheet as an oriented body.

By adopting the abovementioned method, as shown in examples described later, the degree of orientation shows a value of 6.5 and the coercive force shows an extremely high value of 36 kOe. The reason therefore is being intensively studied, and is estimated as follows: unexpected effects are obtained, namely, not only a macroscopic effect is obtained such that a film thickness of the oriented body becomes constant in one film, but also a microscopic effect of increasing magnetic moments is obtained such that the degree of orientation is increased.

(4) Vehicle

In the present invention, a vehicle for curing a dispersion liquid will be described.

As a vehicle used in the present invention, it is preferable to use a vehicle capable of increasing the degree of orientation of platinum group-substituted ε-iron oxide particles typified by Rh-substituted ε-iron oxide or Ru-substituted ε-iron oxide, and from a viewpoint of keeping this condition, it is preferable to use one or more vehicles selected from urethane resin, vinyl chloride resin, and the like, and among them, a combined use of urethane resin and vinyl chloride resin is preferable.

A solution prepared by dissolving these resins in one or more kinds of solvents selected from acetylacetone, n-butyl stearate, cyclohexane, toluene, methyl ethyl ketone and the like may be used as a vehicle.

(5) Magnetic Properties of the Oriented Body Containing Platinum Group-Substituted ε-Iron Oxide Typified by Rh-Substituted ε-Iron Oxide or Ru-Substituted ε-Iron Oxide As a result, a magnetic sheet having the degree of orientation of more than 3.5 which is an oriented body containing platinum group-substituted ε-iron oxide typified by Rh-substituted ε-iron oxide or Ru-substituted ε-iron oxide can be obtained on the base. When the degree of orientation of the magnetic particles in the oriented body such as a magnetic sheet is increased beyond 5.0, it is considered that a magnetic behavior becomes more sharp. As a result, even in the oriented body such as the magnetic sheet, it is expected to improve a magnetic recording density at a level close to the single crystal of the magnetic material and to improve the efficiency of the Faraday effect. Although details will be described in the first embodiment, it is found that the degree of orientation of the magnetic particles defined by the degree of orientation=SQ (direction of magnetization easy-axes)/SQ (direction of magnetization hard-axes) is 6.5 which is greatly exceeding 5.0.

Further, details of the coercive force will also be explained in example 1, but it was possible to produce a value exceeding 31 kOe as described in Non-Patent Document 1.

Namely, it is considered that the magnetic sheet which is an oriented body containing platinum group-substituted ε-iron oxide typified by Rh-substituted ε-iron oxide or Ru-substituted ε-iron oxide of the present invention, exhibits the intrinsic properties of the platinum group-substituted ε-iron oxide typified by Rh-substituted ε-iron oxide or Ru-substituted ε-iron oxide, and the magnetic behavior is extremely sharp. As a result, the magnetic sheet can also be sufficiently applied to a magnetic recording medium using MAMR, MIMR, or F-MIMR system. For example, the magnetic sheet is provided on a base (for example, a PET film or the like) to form a magnetic recording medium. Further, it is also possible to form a large capacity (big data) by laminating the magnetic sheet on the base. In addition, the magnetic sheet can also be expected to improve the magnetic recording density and the efficiency of the Faraday effect at a level close to that of a single crystal even in the oriented body.

Note that in order to apply the magnetic sheet to a magnetic recording medium in which MAMR, MIMR, or F-MIMR system is used, the degree of orientation of the magnetic particles defined by the degree of orientation=SQ (direction of magnetization easy-axes)/SQ (direction of magnetization hard-axes) is set to preferably 5.0 or more, and more preferably 6.5 or more, from a viewpoint of ensuring magnetic recording density. Further, in order to apply the magnetic sheet to a magnetic recording medium in which MAMR, MIMR, or F-MIMR system is used, it is more preferable that the value of the coercive force is 33 kOe or more, more preferably 36 kOe or more, from a viewpoint of ensuring thermal stability.

(6) A Device for Producing an Oriented Body Containing Platinum Group-Substituted ε-Iron Oxide Typified by Rh-Substituted ε-Iron Oxide or Ru-Substituted ε-Iron Oxide of the Present Invention The magnetic sheet which is the oriented body containing platinum group-substituted ε-iron oxide typified by Rh-substituted ε-iron oxide or Ru-substituted ε-iron oxide of the present invention, can be produced without using a dedicated production device. However, if it is intended to produce a magnetic sheet which is an oriented body containing platinum group-substituted ε-iron oxide typified by Rh-substituted ε-iron oxide or Ru-substituted ε-iron oxide of the present invention with high uniformity and productivity, it is preferable to use the device of the present invention described later.

A device for producing the magnetic sheet which is the oriented body containing platinum group-substituted ε-iron oxide typified by Rh-substituted ε-iron oxide or Ru-substituted ε-iron oxide of the present invention, will be described hereafter with reference to the drawings.

Figure 8:
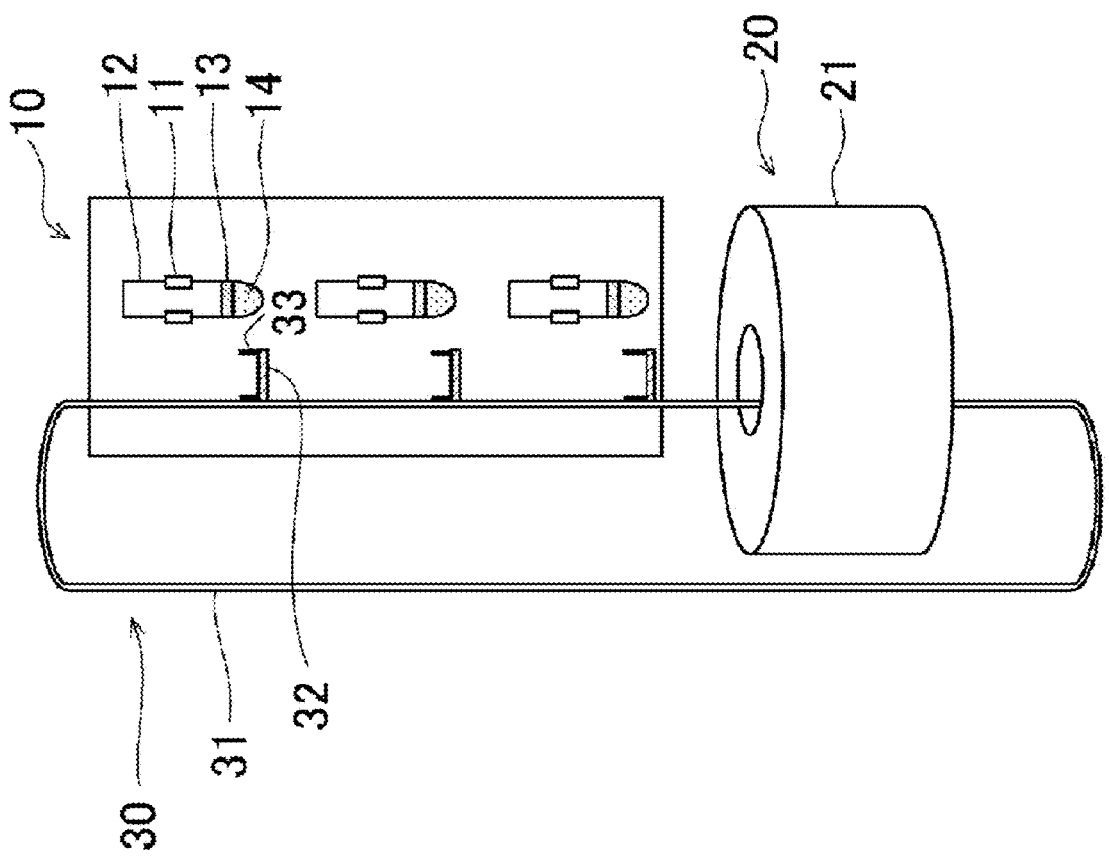
FIG. 8 is a schematic diagram of an example of the device for producing the oriented body containing Rh-substituted ε-iron oxide according to the present invention.

FIGS. 8 to 12 are schematic diagrams of an example of a device for producing an oriented body containing platinum group-substituted ε-iron oxide typified by Rh-substituted ε-iron oxide or Ru-substituted ε-iron oxide according to the present invention, wherein FIG. 8 shows the whole body of the device, and FIGS. 9 to 12 show an operation state of the device.

As shown in FIG. 8, the device includes a shaking part 10, a magnetic field application part 20, and a conveying part 30.

The shaking part 10 is a part for shaking a container 12 by a shaking device 11. The shaking is, for example, a vertical movement, wherein the number of shaking is 100 to 3000 times/min, and the amplitude of shaking is 1 to 10 mm. A mixed solution 13 of Rh-substituted ε-iron oxide particles, a vehicle, and a predetermined solvent, and a mixing ball 14 are charged in the container 12.

The mixing ball 14 is preferably a zirconia ball having a diameter of 0.1 mm to 2 mmφ.

The magnetic field application part 20 has an electromagnet 21 for placing a magnetic field application target in a magnetic field. The electromagnet 21 may be a permanent magnet or a superconducting magnet. Then, the electromagnet 21 can exert a magnetic force on the magnetic field application target with a magnetic flux density of 2 Tesla or more, preferably 3 Tesla or more, more preferably 6 Tesla or more, and most preferably 8 Tesla or more.

The conveying part 30 includes a conveyor 31 that conveys a base 32 (hereinafter also referred to as a substrate 32), which is an object to be conveyed, to the shaking part 10 and the magnetic field application part 20.

Note that as described above, a partition frame 33 is provided on the substrate 32. By providing the partition frame 33, the region S on the substrate 32 is isolated from other regions. A mixed solution 13 (described later) which is a dispersion liquid of platinum group-substituted ε-iron oxide particles typified by Rh-substituted ε-iron oxide or Ru-substituted ε-iron oxide is injected into this region S.

Here, the shape of the region S separated by the partition frame 33 may be arbitrary. For example, it may be square, rectangular, or circular in plan view.

Using the device having the above structure, the oriented body is produced by the following procedure.

Figure 9:
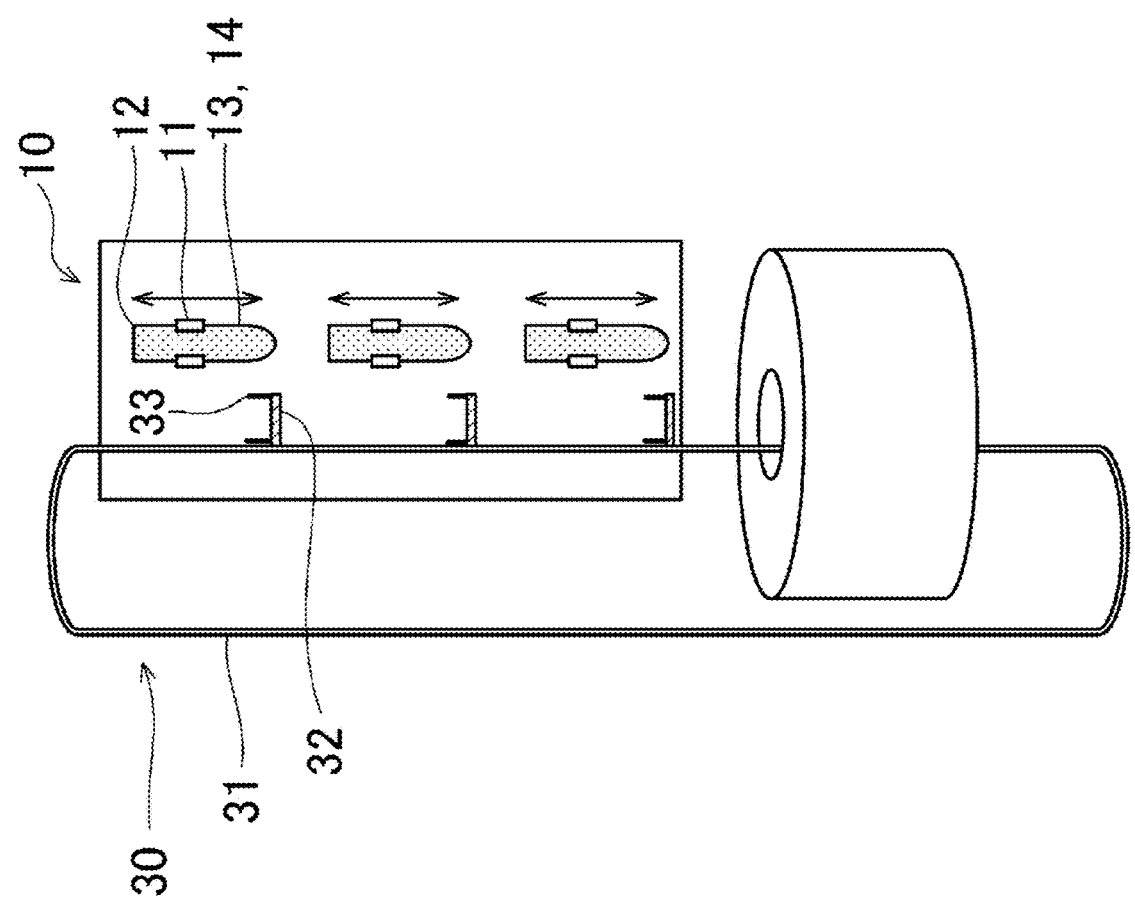
FIG. 9 is a schematic diagram when the device shown in FIG. 8 is performing a shaking motion.

First, as shown in FIG. 9, a dispersion liquid 13 of the platinum group-substituted ε-iron oxide particles typified by Rh-substituted ε-iron oxide or Ru-substituted ε-iron oxide, a vehicle, and a predetermined solvent, and a mixing ball 14, are charged into the container 12. Then, the container 12 is placed in the shaking device 11 and shaken to stir the mixed solution 13 and the mixing ball 14, so that the mixed solution 13 becomes a dispersion liquid of Rh-substituted ε-iron oxide particles.

Figure 10:
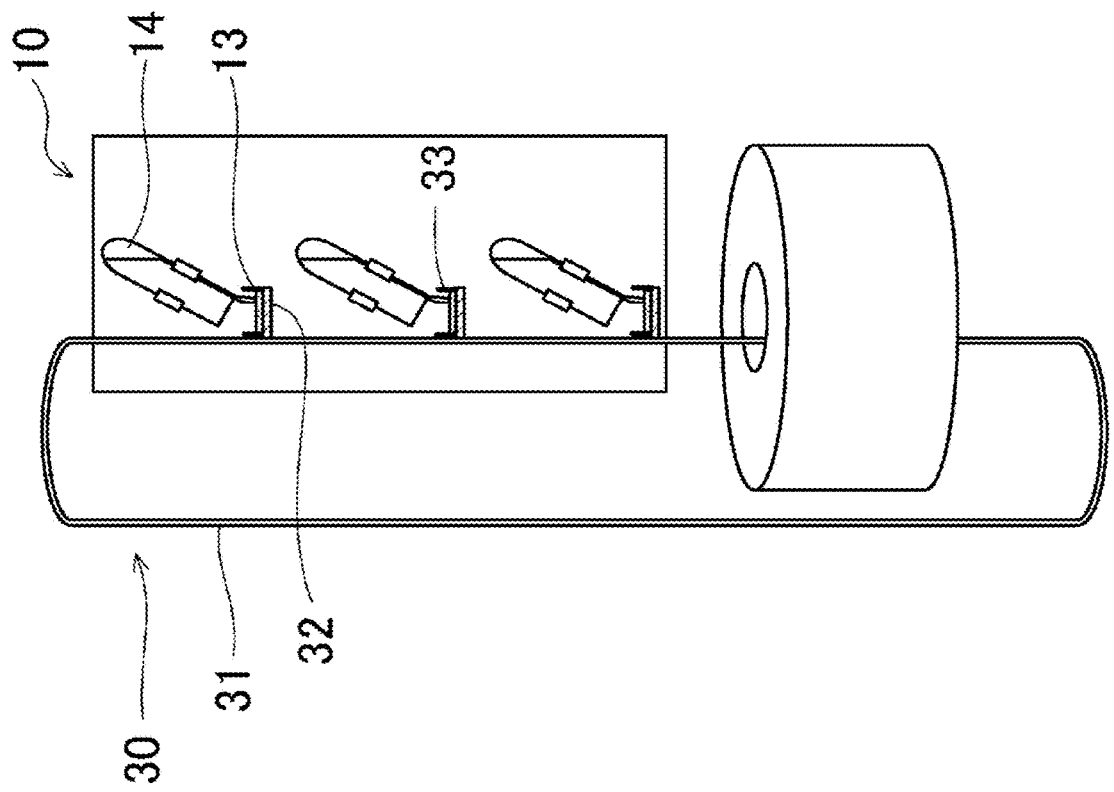
FIG. 10 is a schematic diagram when the device shown in FIG. 8 is performing a dispersion liquid coating operation.

Next, as shown in FIG. 10, the substrate 32 is conveyed to a predetermined position under the container 12 using the conveyor 31. Then, the mixed solution 13 that has become the dispersion liquid is injected from the container 12 into the region S separated by the partition frame 33 on the substrate 32. At this time, the container 12 may be inclined, or the lower part of the container 12 may be opened, or any other method may be used. In any case, it is preferable to provide a mesh or the like in the container 12 so that the mixing ball 14 does not fall onto the substrate 32.

Figure 11:
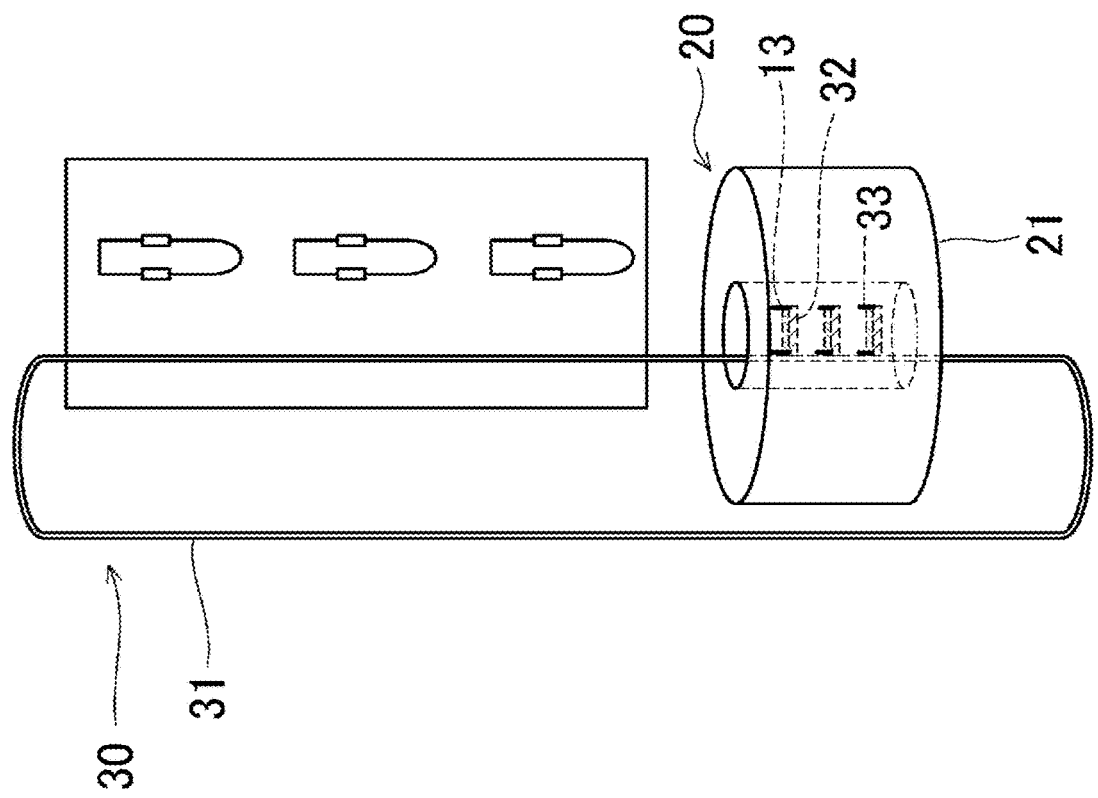
FIG. 11 is a schematic diagram when the device shown in FIG. 8 is performing a magnetic field applying operation.

Next, as shown in FIG. 11, the substrate 32 provided with the dispersion 13, is placed in the electromagnet 21 using the conveyor 31. Then, the substrate 32 provided with the mixed solution 13, which is the dispersion liquid, is placed in a magnetic field having a magnetic flux density of 2 Tesla or more, preferably 3 Tesla or more, more preferably 6 Tesla or more, and most preferably 8 Tesla or more, and the solvent is volatilized and solidified in the region S, while orienting the platinum group-substituted ε-iron oxide typified by Rh-substituted ε-iron oxide or Ru-substituted ε-iron oxide in the mixed solution 13 which becomes the dispersion liquid.

Figure 12:
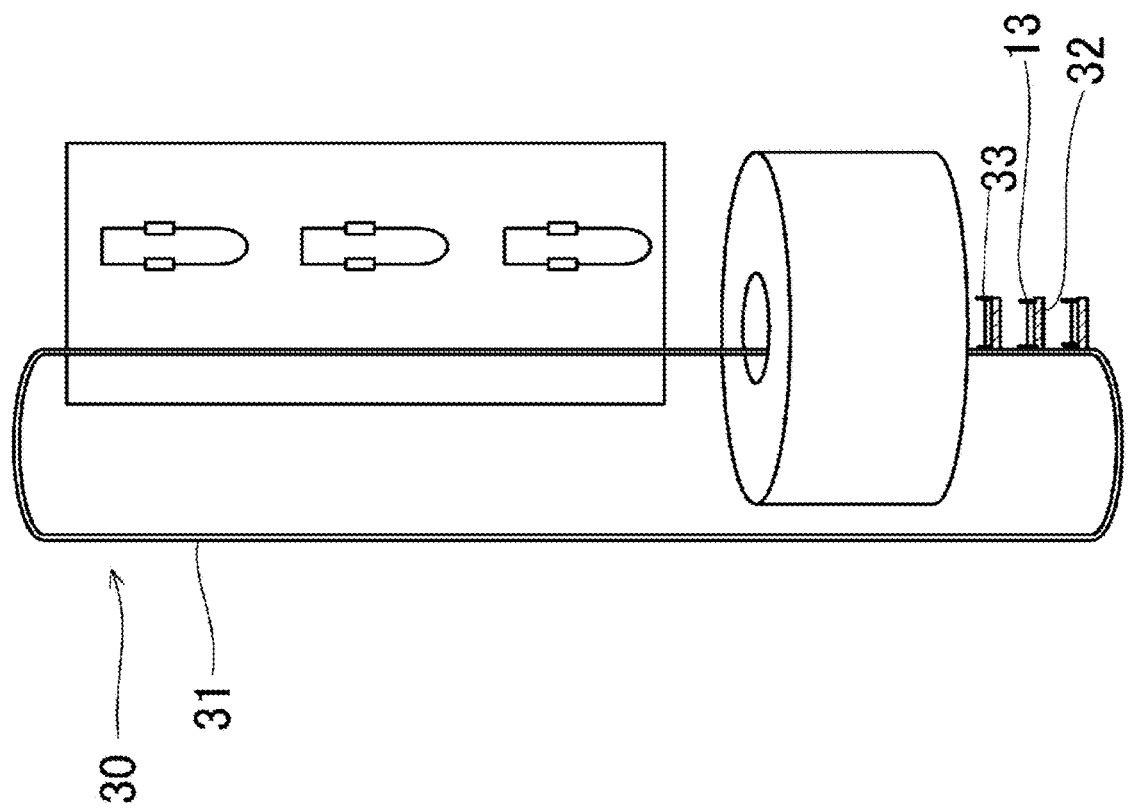
FIG. 12 is a schematic diagram when an oriented body of the present invention is obtained by the device shown in FIG. 8.

When the solvent becomes volatilized and solidified in the mixed solution 13 which becomes the dispersion liquid, as shown in FIG. 12, the substrate 32 having the magnetic sheet solidified and formed in the partition frame 33, namely, in the region S, may be carried out from the inside of the electromagnet 21, using the conveyor 31.

As described above, by using the device for producing the magnetic sheet which is the oriented body containing platinum group-substituted ε-iron oxide typified by Rh-substituted ε-iron oxide or Ru-substituted ε-iron oxide of the present invention, the magnetic sheet which is the oriented body containing platinum group-substituted ε-iron oxide typified by Rh-substituted ε-iron oxide or Ru-substituted ε-iron oxide of the present invention can be produced with high uniformity and productivity.

Note that although MAMR, MIMR, or F-MIMR is a clue that made possible realization of platinum group-substituted ε-iron oxide typified by Rh-substituted ε-iron oxide or Ru-substituted ε-iron oxide, of course, it is not precluded to apply Rh-substituted ε-iron oxide to other uses. For example, a magnetic recording medium of a system other than MAMR, MIMR, or F-MIMR system, an electromagnetic wave absorbing thin film, a millimeter wave absorbing sheet, a sputter target, a bonded magnet, a magnetic film, an oil based ink, and the like, can be used.

Further, although the abovementioned example shows an example of the oriented body containing platinum group-substituted ε-iron oxide typified by Rh-substituted ε-iron oxide or Ru-substituted ε-iron oxide, it is expected that the advantages of providing the abovementioned partition frame 33 can be obtained even when preparing other oriented bodies. Namely, it is also possible to adopt a method for providing the partition frame 33 in order to improve the degree of orientation. The above contents are summarized as follows.

There is provided a method for producing an oriented body, including:

injecting a mixed solution in which metal particles as magnetic particles are dispersed, into a region partitioned by a partition frame on a predetermined base; and removing the solvent of the mixed solution while applying a magnetic field to the region to obtain an oriented body.

Note that as the metal particles, any metal particles may be used as long as they can be magnetic particles. By adopting this method, it is possible to improve the degree of orientation of the obtained oriented body. Further, as described above, the platinum group-substituted ε-iron oxide typified by Rh-substituted ε-iron oxide or Ru-substituted ε-iron oxide, easily generates resonance, so-called ferromagnetic resonance, between high-frequency magnetic field and magnetic moment, when being adopted to MAMR or MIMR. Because such an effect is expected, as a magnetic material for a magnetic recording medium for MAMR or MIMR, a configuration focused on adopting a material that absorbes millimeter waves is as follows.

There is provided a magnetic recording medium, using an oriented body containing epsilon type iron oxide substituted with a metal element, which utilizes a millimeter wave absorption performance by a natural resonance of the epsilon type iron oxide as a magnetic material to be used, and whose magnetic recording mode is millimeter wave assisted magnetic recording (MIMR) or focused millimeter wave resonance magnetic recording (F-MIMR).

EXAMPLES

The present invention will be more specifically described hereafter, with reference to examples.

Example 1

(1) Preparation of Rh-Substituted ε-Iron Oxide Particles

ε-$Fe_2O_3$ crystal particles (ε-$Rh_{0.14}Fe_{1.86}O_3$) of Rh substitution type were prepared.
<Procedure 1>
A raw material solution and mesoporous silica were prepared.
<<Preparation of a Raw Material Solution>>
144.5 mg of rhodium nitrate and 1818 mg of iron nitrate nonahydrate water were dissolved in 1.62 mL of water to prepare a raw material solution.
<<Preparation of Mesoporous Silica>>
72 mL of water, 10.5 mL of ethanol, 5.1 g of hexadecyltrimethylammonium chloride and 8.2 mL of triethanolamine were stirred at 60° C., and thereafter 12.9 g of tetraethylorthosilicate was added. A precipitate was collected by centrifugation at 3500 rpm for 10 minutes and baked at 600° C. for 1 hour in the air atmosphere to obtain mesoporous silica. Then, a synthesized mesoporous silica was heated and dried in a vacuum oven at 60° C. for about 10 hours.
<Procedure 2>
An iron nitrate/rhodium nitrate solution, 7 mL of methanol and 2.8 g of mesoporous silica after heat drying were mixed in an agate mortar and then dried in a vacuum oven at 60° C. for 11 hours, and further, baked for 1 hour at 600° C. in the air atmosphere, and baked at 1200° C. for 4 hours in the air atmosphere.

<Procedure 3>
2.278 g of the obtained powder was added to 100 mL of 5 M NaOH aqueous solution and stirred for 24 hours.
<Procedure 4>
Centrifugation was performed at 3000 rpm for 5 minutes, and a supernatant was discarded.
<Procedure 5>
The obtained precipitate was added to 100 mL of 5 M aqueous NaOH solution in the same manner as in procedure 3, and stirred again for 24 hours, centrifuged at 3000 rpm for 5 minutes, and the supernatant was discarded.
<Procedure 6>
Procedure 5 was repeated four times, and thereafter the precipitate was dried to obtain a target Rh-substituted ε-iron oxide.
(2) Preparation of Rh-Substituted ε-Iron Oxide Particle Dispersion Liquid In addition to the abovementioned Rh-substituted ε-iron oxide, the following vehicle was prepared.
<<Preparation of a Vehicle>>
0.29 g of acetylacetone, 0.25 g of n-butyl stearate, 49.29 g of cyclohexanone, 34.96 g of a methyl ethyl ketone of urethane resin and a toluene solution (UR-8200 manufactured by Toyobo) were mixed and stirred at 1150 rpm for 7 minutes. Further, 15.8 g of polyvinyl chloride (MR 555 manufactured by Zeon Corporation) was added and stirred at 130 rpm for 50 minutes. After stirring overnight (8 hours or more) at less than 200 rpm, 0.37 multiple volume (volume ratio) of cyclohexanone was added and stirred until the solution became homogeneous.

In addition, 0.50 mL of the above vehicle, 0.40 mL of a mixed solvent of methyl ethyl ketone and toluene (v/v=1/1, hereinafter also referred to as a mixed solution), and 20.05 mg of the above Rh-substituted ε-iron oxide were added into a 2.0 mL screw tube. After stirring using a vortex mixer for 1 minute, ultrasonic irradiation was performed for 1 hour.

Then, 10.0 g of zirconia ball (φ=0.30 mm) and a dispersion liquid in the screw tube were added into a 50 mL centrifuge tube. Further, 1.5 mL of the mixed solution was added and shaken at 1500 rpm for 6 hours to obtain an Rh-substituted ε-iron oxide vehicle dispersion liquid.
(3) Preparation of a Magnetic Sheet Which is an Oriented Film Containing Rh-Substituted ε-Iron Oxide Particles A frame made of titanium (Ti) having a thickness of 5 mm and an inner size of 20 mm×20 mm prepared as a partition frame 33, was adhered to a 25 mm×25 mm PET film (Lumirror, manufactured by Toray Industries, Inc.) prepared as the base 32, using a double-sided tape. 100 μL, of the Rh-substituted ε-iron oxide vehicle dispersion liquid was added dropwise onto the film surrounded by the frame (namely, on the region S), and dried in the film vertical direction for 3 hours while applying 3 T (Tesla) magnetic field for 95 hours, to obtain an oriented body (oriented film) of film-like Rh-substituted ε-iron oxide.
(4) Magnetic Properties of a Magnetic Sheet Which is the Oriented Film Containing Rh-Substituted ε-Iron Oxide Particles Magnetic properties of the magnetic sheet which is the oriented film containing Rh-substituted ε-iron oxide particles of example 1 will be described, with reference to the drawings.

Figure 5:
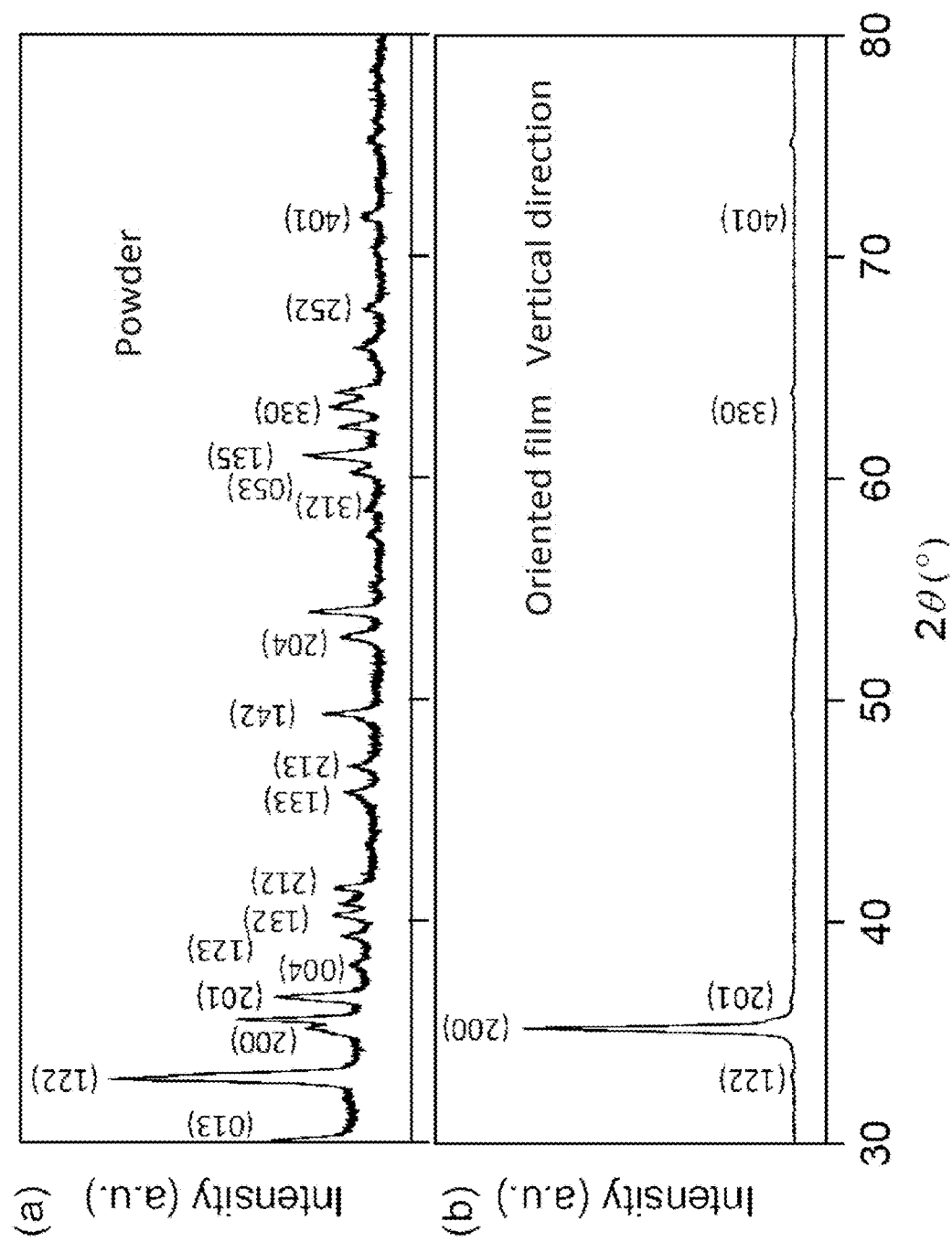
FIG. 5 is a plot showing an XRD pattern of Rh-substituted ε-iron oxide according to example 1 of the present invention, wherein (a) is a plot of Rh-substituted ε-iron oxide powder, and (b) is a plot of an oriented film prepared by solidifying the powder with a photocurable resin.

FIG. 5 is a plot showing a powder X-ray diffraction (XRD) pattern of Rh-substituted ε-iron oxide according to example 1 of the present invention, wherein (a) is a plot of a powder of Rh-substituted ε-iron oxide, and (b) is a plot of the oriented film prepared by solidifying the powder with a photocurable resin.

From the XRD measurement, it was found that the composition of the synthesized Rh-substituted ε-iron oxide (powder) was as follows: ε-$Rh_{0.14}Fe_{1.86}O_3$ was 71% and α-$Rh_{0.24}Fe_{1.76}O_3$ was 29% (FIG. 5 (a)). The composition ratio of each phase was obtained from ICP-MS and lattice constants of ε-$Fe_2O_3$ and $Rh_2O_3$.

On the other hand, regarding the obtained oriented film, it was found that the [100] direction was oriented in a vertical direction (FIG. 5 (b)) by XRD measurement and Rietveld analysis.

Incidentally, the value of the degree of orientation having a definition different from the above formula (1), is shown below for reference. The degree of orientation obtained from FIG. 5 is the Lotgering orientation degree F. The orientation degree F. is defined by the following formula.

$$F=(P_{orient}-P_{onorient})/(1-P_{nonorient}) \qquad \text{Formula (2)}$$

In the abovementioned orientation degree F., when P is set as a peak intensity ratio derived from (200) plane on the assumption that I (hkl) in FIG. 5 is the intensity of the peak derived from the (hkl) plane, a relationship such as P=I (200)/ΣI (hkl) is obtained. Then, $P_{orient}$ is the value of P in the oriented film containing Rh-substituted ε-iron oxide particles of example 1, and $P_{nonorient}$ is the value of P in the Rh-substituted ε-iron oxide particles in the reference sample, namely, in a completely unoriented case. Note that the above formula (2) is the formula in which F=1 is established for a single crystal and F=0 is established for a non-oriented polycrystal.

As a result of calculating Lotgering orientation degree F. under such conditions, 0.96 was obtained. Therefore, even if the degree of orientation was defined by the above formula (2), it was found that the crystal was very well oriented to one side. Further, it is preferable that the degree of orientation of the Lotgering F is 0.96 or more.

Figure 6:
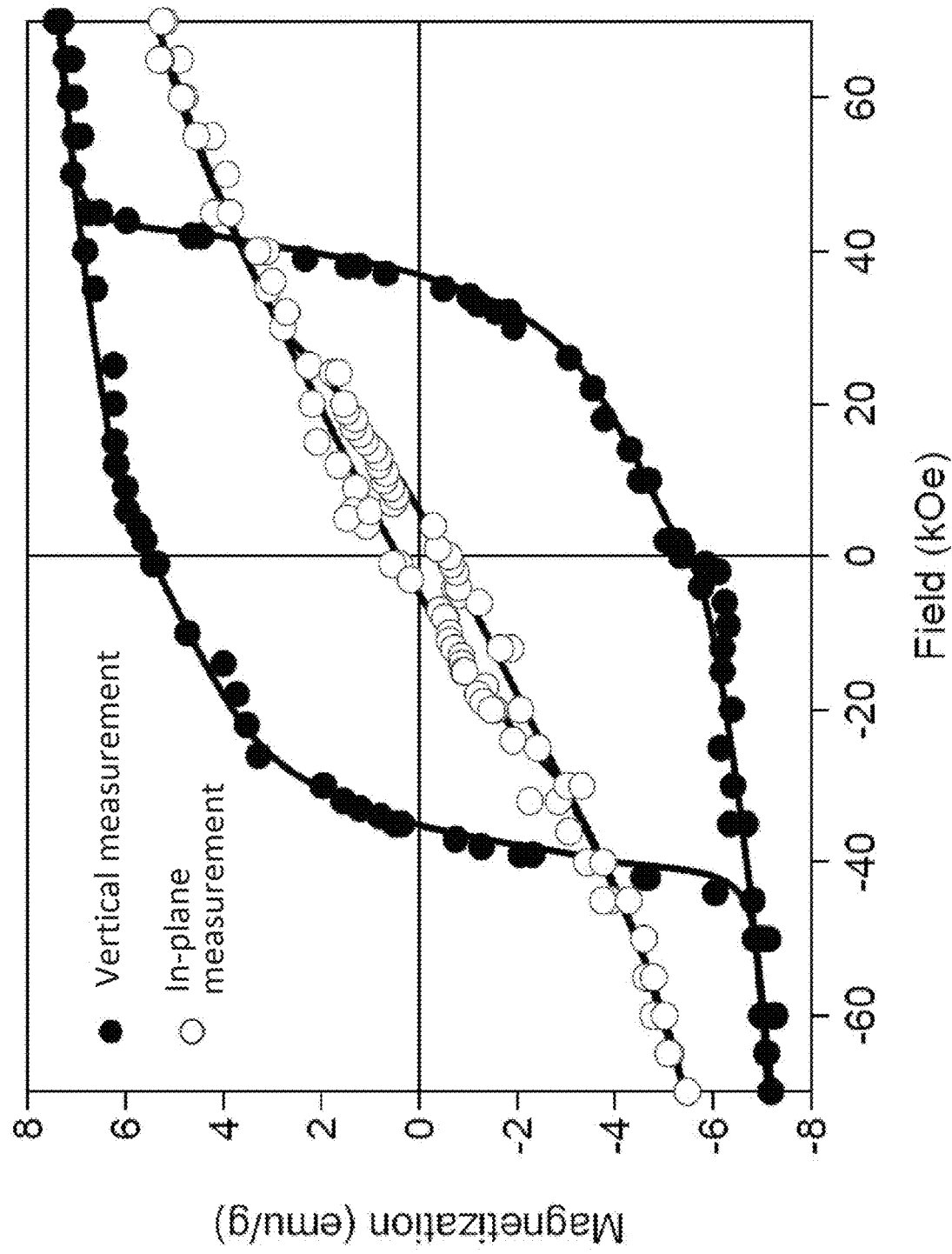
FIG. 6 is a graph showing a magnetization curve at ±70 kOe of an oriented body containing Rh-substituted ε-iron oxide according to example 1 of the present invention.

FIG. 6 is a graph showing a magnetic hysteresis loop (magnetization curve) at room temperature (300 K) and at 70 kOe (5.57×10⁶ A/m) of a magnetic sheet which is an oriented body containing Rh-substituted ε-iron oxide according to example 1.

FIG. 6 is a graph showing a magnetic hysteresis loop (magnetization curve) at room temperature (300 K) at 70 kOe (5.57×10₆ A/m) of a magnetic sheet which is an oriented film containing Rh-substituted ε-iron oxide particles of example 1.

Further, FIG. 6 shows the results obtained by measuring the magnetic hysteresis loop in which the direction of magnetization hard-axes (referred to as an in-plane direction hereafter) is set as 0° and a direction vertical)(90° thereto is set as a direction of magnetization easy-axes (referred to as a vertical direction hereafter).

Here, in FIG. 6, a loop in the vertical direction was plotted with ●, and a loop of 90° (in-plane direction) was plotted with ○.

Note that in order to measure the magnetic hysteresis loop, a superconducting quantum interferometer (SQUID) of MPMS 7 manufactured by Quantum Design Corporation was used. Then, the value of a measured magnetic moment is normalized by the mass of iron oxide.

From FIG. 6, it was found that when an external magnetic field was applied in the vertical direction and the in-plane direction of the oriented film to measure a magnetized magnetic field curve, a coercive force (Hc), a saturation magnetization (Ms) and a residual magnetization (Mr) were respectively He=36 kOe, Ms=7.4 emu/g, Mr=5.5 emu/g in the vertical direction, and He=6 kOe , Ms=5.3 emu/g, Mr=0.60 emu/g in the in-plane direction.

Further, from FIG. 6, it was found that the oriented body containing Rh-substituted ε-iron oxide of the present invention exhibits intrinsic properties of the Rh-substituted ε-iron oxide.

Further, from the measurement of the magnetized magnetic field curve in FIG. 6, values of saturation magnetization, residual magnetization and squareness ratio (SQ) were obtained from the vertical direction to the in-plane direction. The results are shown in the table below.

TABLE 1

|  | $M_s$ (emu/g) | $M_r$ (emu/g) | SQ |
| --- | --- | --- | --- |
| Powder | 7.4 | 3.5 | 0.47 |
| Vertical direction | 7.4 | 5.5 | 0.74 |
| In-plane direction | 5.3 | 0.6 | 0.11 |

From the results of the above table, it was found that in the oriented body (magnetic sheet) of example 1, the value of the degree of orientation defined by degree of orientation =SQ (direction of magnetization easy-axes, namely vertical direction)/SQ (direction of magnetization hard-axes, namely in-plane direction) was 6 .7 (=0.74/0.11), which was a value exceeding 3.5.

Note that as the coercive force (Hc) of the powder before molding into the oriented body (magnetic sheet) was found as follows by this measurement: the saturation magnetization (Ms) was 7.4 emu/g, the residual magnetization (Mr) was 3.5 emu/g, and the squareness ratio (SQ=Mr/Ms) was 0.47, at 27 kOe, 7 T.

Further, the coercive force was 27 kOe in the powder state, but it was remarkably improved to 36 kOe (in-plane direction) by molding into an oriented body (magnetic sheet). Further, in ε-$Fe_2O_3$ crystal particles (ε-$Ru_{0.007}Fe_{1.993}O_3$) in which a part of iron is substituted with ruthenium as a magnetic powder, improvement of the coercive force of 16% was confirmed, although it was a small amount of substitution compared with unsubstituted ε-$Fe_2O_3$ crystal particles. As the powder, the effect of improving the coercive force is observed in the same manner as rhodium substituted ε-$Fe_2O_3$, and therefore this powder can be used as a material for microwave assisted magnetic recording or millimeter wave assisted magnetic recording in the same manner.

As a result, in example 1, a magnetic behavior is sharp, and application to a magnetic recording medium is also possible, in which MAMR, MIMR, or F-MIMR system is used. Further, also in the magnetic sheet which is the oriented film containing Rh-substituted ε-iron oxide particles of example 1, improvement of magnetic recording density at a level close to a single crystal and improvement of efficiency of Faraday effect can be expected.

Comparative Example 1

The degree of orientation in the orientated body containing The ε-type iron oxide magnetic particles (Ga substitution type ε-$Fe_2O_3$ crystal particles (wherein the molar ratio of Ga and Fe is expressed as Ga:Fe=x: (2 −x), x=0.45) obtained by substitution with Ga obtained in example 1 of the Japanese Patent Laid Open Publication No. 2016-135737 by the present inventors, was obtained based on a measurement similar to the measurement described in the examples and found to be 4.6, and it was found that the degree of orientation was remained at a lower degree than the degree of orientation of the oriented body of example 1 of the present invention.

DESCRIPTION OF SIGNS AND NUMERALS

10 Shaking part
11 Shaking device
12 Container
13 Mixed solution (dispersion liquid)
14 Mixing ball
20 Magnetic field application part
21 Electromagnet
30 Conveying part
31 Conveyor
32 Base (substrate)
33 Partition frame

The invention claimed is:

1. An oriented body containing platinum group element-substituted ε-iron oxide particles in which a part of ε-iron oxide is substituted with at least one element of platinum group elements, as magnetic particles
wherein the degree of orientation of the magnetic particles defined by the degree of orientation =SQ (direction of magnetization easy-axes)/SQ (direction of magnetization hard-axes) exceeds 5.0, and a coercive force is 33 kOe or more.

2. The oriented body according to claim 1, wherein the platinum group element is rhodium (Rh) or ruthenium (Ru).

3. A magnetic recording medium, for microwave assisted magnetic recording (MAMR), millimeter wave assisted magnetic recording (MIMR) or focused millimeter wave resonance magnetic recording (F-MIMR) in which the oriented body of claim 1 is used.

4. The magnetic recording medium according to claim 3, in which a millimeter wave absorption performance is utilized, which is generated due to a natural resonance of the magnetic particles of claim 1, and a magnetic recording mode is the millimeter wave assisted magnetic recording (MIMR) or the focused millimeter wave resonance magnetic recording (F-MIMR).

5. An oriented body containing Rh-substituted ε-iron oxide particles in which a part of ε-iron oxide is substituted with rhodium (Rh) as magnetic particles,
wherein the degree of orientation of the magnetic particles defined by the degree of orientation =SQ (direction of magnetization easy-axes)/SQ (direction of magnetization hard-axes) is 6.5 or more, and
a coercive force is 36 kOe or more.

6. A magnetic recording medium, for microwave assisted magnetic recording (MAMR), millimeter wave assisted magnetic recording (MIMR) or focused millimeter wave resonance magnetic recording (F-MIMR) in which the oriented body of claim 2 is used.

* * * * *